United States Patent
Vacante

[15] 3,669,465
[45] June 13, 1972

[54] DUAL WHEEL STEERING MEANS

[72] Inventor: Matthew Vacante, 500 Dawson Lane, Jericho, N.Y. 11753

[22] Filed: Aug. 6, 1970

[21] Appl. No.: 61,685

[52] U.S. Cl. ..................280/87 R, 280/150 AB, 180/78, 74/498
[51] Int. Cl. ..........................................................B62d 1/04
[58] Field of Search ..................280/87 R, 87 A, 96; 180/78, 180/90; 74/494, 498, 492, 491, 552

[56] References Cited

UNITED STATES PATENTS

| | | | |
|---|---|---|---|
| 3,271,045 | 9/1966 | Vacante | 280/87 |
| 2,198,407 | 4/1940 | DeBrun | 74/494 |
| 2,522,694 | 9/1950 | Vogel | 74/498 |
| 2,221,409 | 11/1940 | Phelps et al | 180/78 X |
| 2,622,690 | 12/1952 | Barenyi | 180/78 |
| 3,176,537 | 4/1965 | Zeigler | 287/87 X |
| 3,186,729 | 6/1965 | Vacante | 280/87 |
| 3,580,603 | 5/1971 | Chute | 280/87 |

*Primary Examiner*—Kenneth H. Betts
*Attorney*—James P. Malone

[57] ABSTRACT

A dual hand wheel steering assembly is adapted to be substituted for the conventional steering wheel on vehicles. The assembly consists of left and right hand wheels and a gear box which is mounted on the existing steering shaft. Horn buttons are provided. An instrument panel and an air bag safety device may be mounted on the gear box between the hand wheels for the protection of the operator.

6 Claims, 4 Drawing Figures

INVENTOR.
MATTHEW VACANTE

INVENTOR.
MATTHEW VACANTE

DUAL WHEEL STEERING MEANS

The present invention relates to steering wheel means for vehicles, and more particularly, to a left and right hand wheel assembly, which is adapted to be easily substituted for a conventional single steering wheel.

This application is an improvement of my prior U.S. Pat., Nos. 3,186,729 and 3,271,045.

The present invention provides an assembly that can be easily installed in a vehicle by removing the standard steering wheel and mounting the present assembly onto the existing steering shaft.

The left and right hand wheels of the present invention are geared to the existing steering shaft and permit the user to hold his arms at a lower and more comfortable position. An instrument panel may be mounted on the present assembly, if desired, for easier reading and control. Also, a safety air bag device may be conveniently mounted on the front of the gear box between the two hand wheels in close proximity to the operator.

The air bag device itself is is conventional and is of the type which is mounted on the dashboard and inflates instantly upon impact to protect the occupants. It is impossible to mount the air bag device on the conventional steering wheel in order to properly protect the driver.

Accordingly, a principal object of the invention is to provide new and improved steering wheel means for vehicles.

Another object of the invention is to provide new and improved steering wheel means for vehicles having left and right hand wheels located so the operator's arms may be held substantially horizontally.

Another object of the invention is to provide new and improved steering wheel means having left and right hand wheels with provision for mounting an instrument panel between the hand wheels in close proximity to the driver for easy visibility and control by the driver.

Another object of the invention is to provide means for mounting an air bag safety device for protecting the driver of the vehicle.

These and other objects of the invention will be apparent from the following specification and drawings, of which:

Referring to the figures, the invention generally comprises left and right hand wheels 1, 2 which are mounted on a gear box 3. The whole assembly is mounted in the vehicle by removing the conventional steering wheel and mounting the assembly on the existing steering shaft. The hand wheels 1 and 2 are mounted in a lower position than a conventional single steering wheel so that the driver's arms may be held in a comfortable horizontal position.

Figure 1:
FIG. 1 is a perspective view of an embodiment of the invention.
Figure 2:
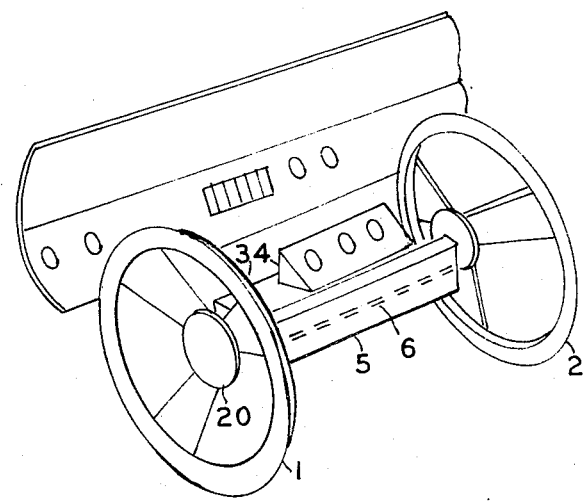
FIG. 2 is a perspective view of an embodiment of the invention, illustrating the mounting of an instrument panel and air bag device for protecting the driver.

FIG. 2 illustrates how an instrument panel 4 may be mounted on the gear box 3. Also shown in FIG. 2 is an air bag safety device 5, which may be mounted on the gear box between the left and right hand wheels. The air bag device is conventional and is an elongated plastic package which contains a folded air bag. Conventional means are provided for instantly inflating the bag and breaking open the plastic package along the perforated line 6, so that the air bag will expand instantly and protect the driver.

The present arrangement provides an optimum mounting for the air bag device that permits use of this device to protect the driver. The mounting of the air bag device is not practical where there is a single steering wheel, so that in standard vehicles having convention single steering wheels, it is not possible to properly protect the driver with an air bag device.

Figure 4:
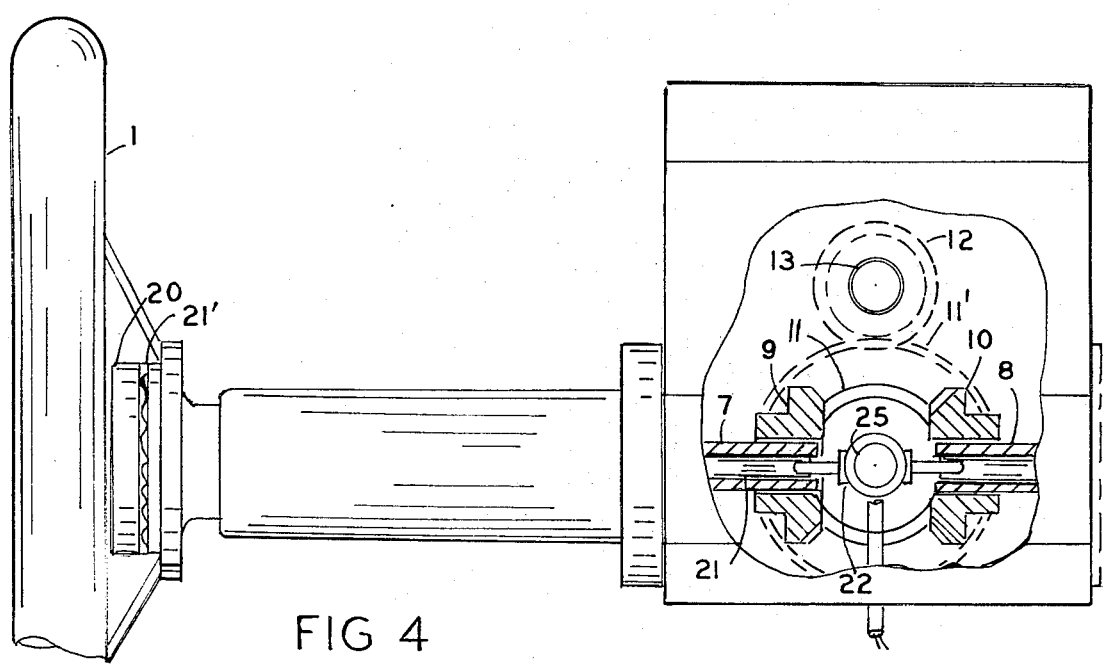
FIG. 4 is a front view partially in section of an embodiment of the invention.
Figure 3:
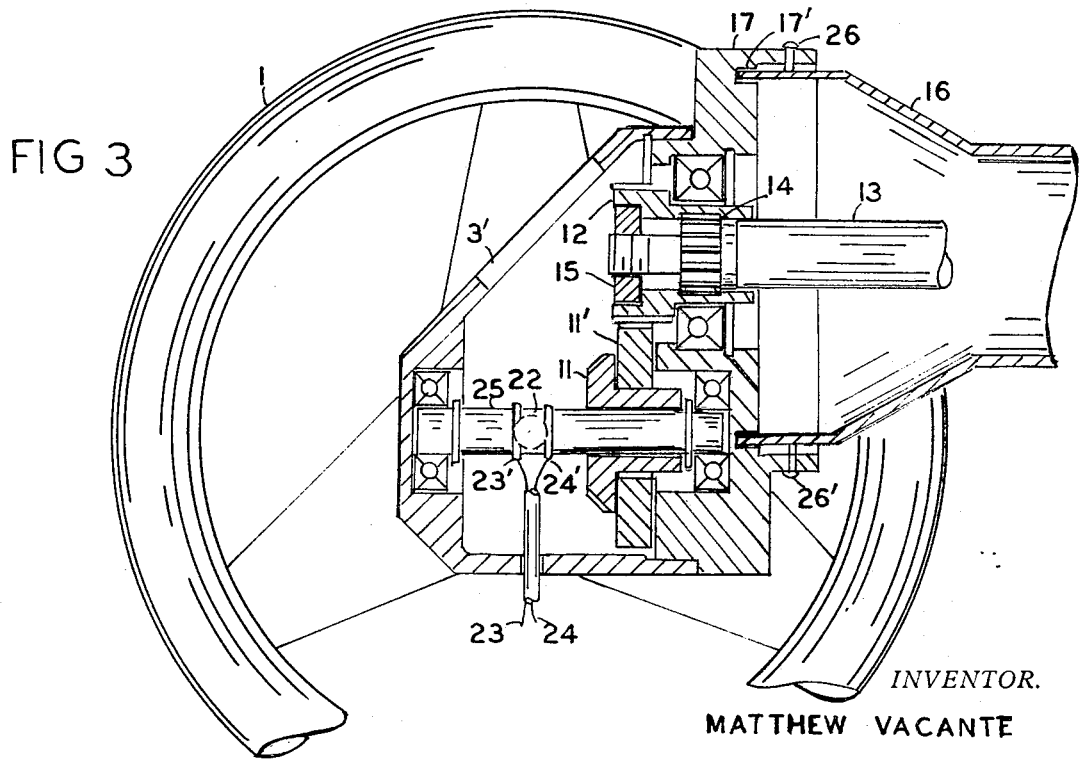
FIG. 3 is a side sectional view of the embodiment of the invention.

FIGS. 3 and 4 show the interior construction of the device. The left and right hand wheels 1 and 2 are mounted on shafts 7 and 8 which have mounted on their ends gears 9 and 10 which engage the ring gear 11 mounted on shaft 25, which is fixedly connected to gear 11' which engages the small ring gear 12. All of these gears are mounted in suitable ball bearings in the gear box 3. The ring gear 12 has an interior spline which is adapted to be mounted on the conventional steering shaft 13 and engage the spline 14 on the steering shaft. The gear 12 is then secured to the steering shaft 13 by means of the nut 15. This connection supports the weight of the assembly. A gear ratio between hand wheels and output gear of 1:1.75 has been found suitable in operation.

In order to keep the gear assembly from rotating on the steering shaft, the assembly is also connected to the conventional steering shaft cover 16, which generally has a conical shape at its open end. This connection is made by means of the collar member 17 which is a part of the gear box 3. The collar 17 has a slot 17' which is adapted to receive the existing steering shaft cover 16 and it may be secured thereto by conventional means as set screws. This connection prevents the dual wheel assembly from rotating on the steering shaft.

Horn buttons 20 are provided on the left and right hand wheels. Each horn button is connected to a horn operating shaft 21, slidably mounted inside the hand wheel shafts, which has an electrical contact member 22 at its inner end. The horn operating wires 23, 24 terminate in a pair of conductor rings 23', 24' which are mounted on and insulated from shaft 25 of the gear box assembly. The rings 23' and 24' are insulated from the shaft 25 but have conductive outer surfaces so that they may be connected together by contact members 22, 22' when the horn buttons are pushed. The horn shafts are spring loaded outwardly by means of spring 21' and a corresponding spring on the other side.

In order to install the present assembly in a conventional vehicle, the conventional single steering wheel is removed by removing the nut 15. The present assembly is then mounted on the steering shaft 13 by sliding it on the splined portion of the steering shaft 13 and re-installing the nut 15. The assembly is adjusted so that the axis of the left and right hand wheels is horizontal and the assembly is then secured to the steering shaft cover 16 by means of set screws 26, 26', and the installation is then complete. The nut 15 is tightened through the aperture 3' and the gear box 3 and this aperture may then be closed with a snap-on cover.

Therefore, the present invention provides new steering wheel means which are easy to install and which are much safer than the conventional steering wheel, which is frequently the cause of serious injury.

I claim:

1. Dual wheel steering means for vehicles of the type having a steering shaft comprising:
    a gear box adapted to be mounted on said steering shaft,
    a first gear mounted in said gear box and connected to said steering shaft by gearing, second and third gears mounted in said gear box, and connected to said first gear,
    first and second shafts mounted in said gear box and connected to said second and third gears said first and second shafts extending along an axis perpendicular to said steering shaft,
    first and second hand wheels each connected to said first and second shafts, for opposite rotation when steering.

2. Apparatus as in claim 1 wherein said steering shaft is of the type having a stationary cover and said gear box is connected to said cover to prevent rotation of said gear box with respect to said steering shaft.

3. Apparatus as in claim 2 having first and second horn buttons, each mounted on one of said first and second hand wheels.

4. Apparatus as in claim 3 wherein said horn buttons are connected to horn operating shafts which are slidably mounted in said first and second hand wheel connected shafts, said horn operating shafts being adapted to make contact with said vehicle steering shaft.

5. Apparatus as in claim 2 wherein said gear box has an instrument panel mounted thereon.

6. Apparatus as in claim 2 wherein said gear box has a safety air bag mounted thereon.

* * * * *